United States Patent [19]
Lorence

[11] 3,738,194
[45] June 12, 1973

[54] IMPROVED SPEED REDUCING TRANSMISSION

[75] Inventor: Ervin W. Lorence, Cedarburg, Wis.

[73] Assignee: Lorence Manufacturing Corp., Milwaukee, Wis.

[22] Filed: Feb. 11, 1971

[21] Appl. No.: 114,558

[52] U.S. Cl............ 74/805, 74/804, 180/9.62
[51] Int. Cl............ F16h 1/28, B62d 55/12
[58] Field of Search............ 74/804, 805; 180/9.62, 9.64, 6.48, 6.7

[56] References Cited
UNITED STATES PATENTS

| | | | |
|---|---|---|---|
| 3,429,393 | 2/1969 | Lorence | 74/805 X |
| 3,494,439 | 2/1970 | Kline | 180/6.48 |
| 2,978,051 | 4/1961 | Risk et al. | 180/9.62 |
| 3,534,636 | 10/1970 | Lorence | 74/805 |

FOREIGN PATENTS OR APPLICATIONS

| | | | |
|---|---|---|---|
| 54,907 | 11/1950 | France | 74/805 |
| 529,287 | 9/1921 | France | 74/805 |

Primary Examiner—Charles J. Myhre
Assistant Examiner—Thomas C. Perry
Attorney—Andrus, Sceales, Starke & Sowall

[57] ABSTRACT

An improved speed reducing transmission having particular use in driving the endless treads of heavy construction equipment. One end of the tread frame is provided with a recess or slot and the transmission is removably secured within the slot. The transmission includes a pair of fixed end plates secured to the tread frame and a motor is mounted on one of the end plates. The motor drive shaft drives an eccentric which is mounted for rotation within an opening in a floating gear unit located between the end plates. The gear unit is composed of a central large diameter gear and a pair of small diameter gears located on each side of the large diameter gear. Each of the small diameter gears is adapted to engage a fixed gear ring, while the larger central gear is adapted to engage a rotatable output member that is connected to the drive sprocket for the tread. Rotation of the eccentric acts to drive the smaller gears in the opposite direction and at a slower rate of speed to provide a first stage speed reduction and results in the output member being driven by the larger gear at a further reduced speed to provide a second stage speed reduction.

5 Claims, 7 Drawing Figures

PATENTED JUN 12 1973

INVENTOR
ERVIN W. LORENCE

BY
Andrus, Sceales, Starke & Sawall

ATTORNEYS

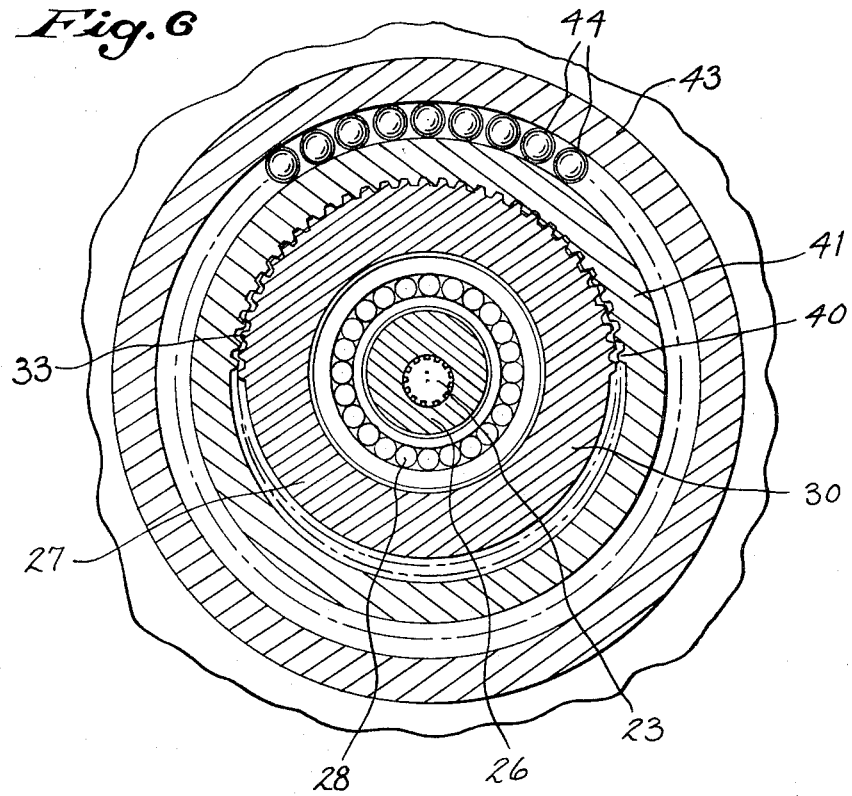
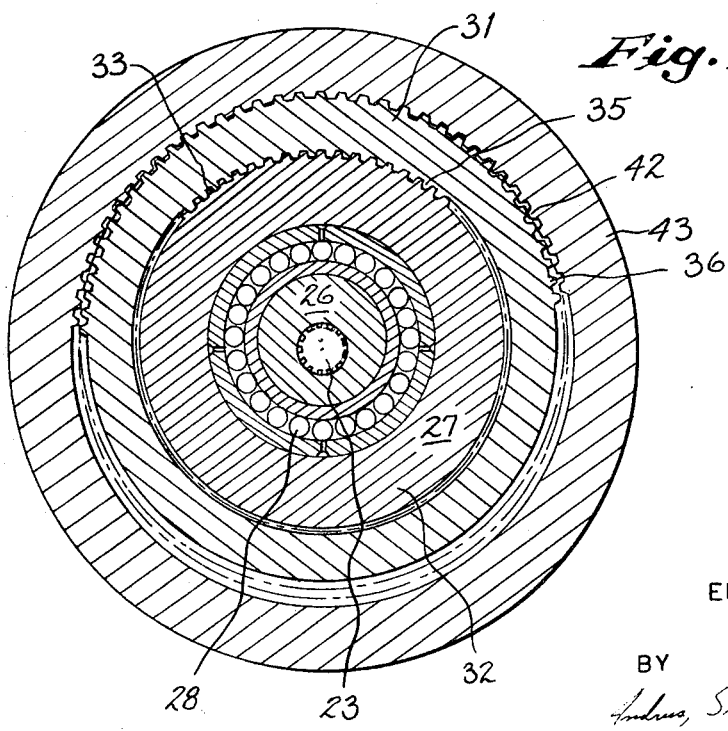

IMPROVED SPEED REDUCING TRANSMISSION

BACKGROUND OF THE INVENTION

This invention relates to an improved speed reducing transmission having particular application for driving the treads or crawlers of heavy construction equipment.

Heavy construction equipment, such as a bulldozer, crane, shovel, and the like, is normally mounted for movement on crawlers, each of which includes an endless tread that is trained over a drive sprocket at one end and an idler sprocket at the opposite end with a series of bogie wheels supporting the tread between the two sprockets. Due to the low speed requirements for the tread, speed reducing transmissions are required between the driving source and the drive sprocket. In the past the power or driving source has normally been mounted on the cab of the backhoe or crane and a complicated gear train transmission has been used to interconnect the drive source on the cab with the drive sprocket on the tread. More recently, hydraulic motors have been employed for driving the tread, and the common practice has been to mount the hydraulic motor on the frame of the tread and connect the motor via a conventional gear train transmission to the drive sprocket.

U.S. Pat. No. 3,429,393 of the same inventor relates to an improved speed reducing transmission which has particular application for driving the treads or crawlers of heavy construction equipment and eliminates the normal gear train transmission. In the transmission of the aforementioned patent, the hydraulic motor drives an eccentric which is mounted for rotation within an opening in a central floating gear unit including a large diameter gear and a small diameter gear. The small diameter gear is engaged with a fixed gear ring, while the large diameter gear is engaged with a rotatable gear ring that is connected to the drive sprocket. Each of the gear rings is provided with a greater number of teeth than the corresponding gear and rotation of the eccentric result in a substantial speed reduction to the rotatable gear ring. The transmission described in the aforementioned United States patent is a compact unit carried entirely by the tread frame which can achieve substantial speed reductions without the use of conventional and complicated gear train transmissions.

SUMMARY OF THE INVENTION

This invention is an improvement to the speed reducing transmission of U.S. Pat. No. 3,429,393, and has particular application for driving the endless treads of heavy construction equipment. According to the invention, the end of each tread frame is provided with a recess or slot and the transmission is adapted to be removably secured within the slot. The transmission includes a pair of fixed end plates which are bolted to the tread frame and a hydraulic motor is mounted on one of the end plates. The motor drive shaft drives an eccentric mounted for rotation within an opening in a floating gear unit. The floating gear unit is composed of a large diameter central gear and a pair of smaller diameter outer gears which are located on either side of the large diameter gear. Each of the small diameter gears is engaged with a fixed gear ring carried by one of the end plates, while the large diameter gear is engaged with a rotatable gear ring or output member that is connected to the drive sprocket for the endless tread.

The small diameter gears and the large diameter gear have a lesser number of teeth than the corresponding gear rings. Rotation of the eccentric within the opening in the gear unit causes the gear unit to rotate in the opposite direction and at a slower rate of speed due to the wedging action provided by the engagement of the small diameter gears with the fixed gear rings. Rotation of the gear unit correspondingly drives the outer rotatable gear ring in the opposite direction from that of the gear unit and at a still slower rate of speed by a wedging action to provide a second stage of speed reduction.

The invention also provides a unique manner of constructing the floating gear unit which insures a precise indexing of the two small gears. The gear unit is fabricated by initially machining gear teeth continuously throughout the depth or axial length of a central hub. A ring having both internal and external teeth is then engaged with the central portion of the teeth on the hub, so that engaged internal teeth of the ring and the external teeth of the hub provide a type of spline connection to integrally connect the hub and the ring. Thus, the external teeth of the ring define the large diameter gear, and the teeth of the hub, located on either side of the ring, define the two small diameter gears. This construction not only reduces the overall size of the floating gear unit, but insures precise indexing of the teeth of the two smaller diameter gears, The transmission of the invention is designed to provide a speed reduction from the hydraulic motor to the drive sprocket of the tread of approximately 130 : 1 which is a substantially greater speed reduction than is achieved by conventional gear train transmissions. Speed reductions of this magnitude with gear train transmissions are generally impractical due to the expense involved in fabrication of the multiplicity of gears. Furthermore, the 130 : 1 speed reduction achieved by the transmission of the invention enables the hydraulic motor to operate at an optimum efficiency of approximately 1,300 r.p.m. and provide an output to the drive sprocket of approximately 10 r.p.m. thereby providing a substantially greater output torque than can be achieved with conventional transmissions.

The use of the two small diameter gears in conjunction with the single large diameter gear eliminates problems of side thrust that are normally encountered when dealing with substantial loads as encountered in heavy construction equipment.

The invention also provides an improved mounting structure for the transmission in which the transmission can be inserted or withdrawn from the tread frame with minimum labor. This is a substantial aid in maintenance and repair of the transmission.

Other objects and advantages will appear in the course of the following description.

DESCRIPTION OF THE DRAWINGS

The drawings illustrate the best mode presently contemplated of carrying out the invention.

In the drawings:

FIG. 6 is a section taken along line 6—6 of FIG. 5; and

FIG. 7 is a section taken along line 7—7 of FIG. 5.

DESCRIPTION OF THE PREFERRED EMBODIMENT

Figure 1:
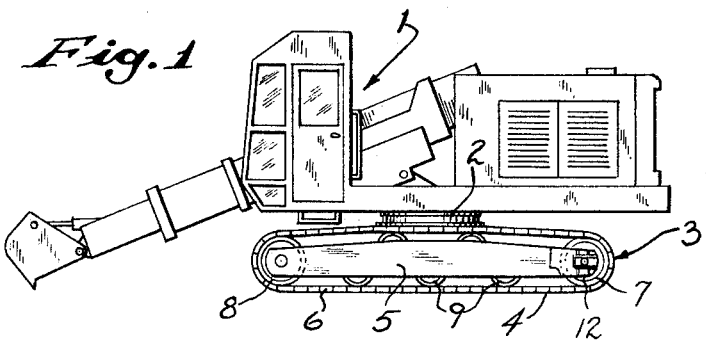
FIG. 1 is a side elevation of a typical backhoe incorporating the improved transmission of the invention.

FIG. 1 illustrates a conventional backhoe which incorporates the improved speed reducing transmission of the invention and includes a cab 1 which is rotatably mounted through a turntable unit 2 on a supporting structure 3.

The supporting structure 3 is provided with a pair of crawler assemblies 4 which provide mobility for the backhoe. Each of the crawler assemblies 4 include a structural frame 5 and an endless tread 6 is trained over a drive sprocket 7, an idler sprocket 8, and a series of bogie wheels 9 which are journalled on the frame 5. The drive sprocket 7 is driven through the transmission 10 of the invention to thereby move the tread 6 in endless travel and provide mobility for the backhoe.

Figure 2:
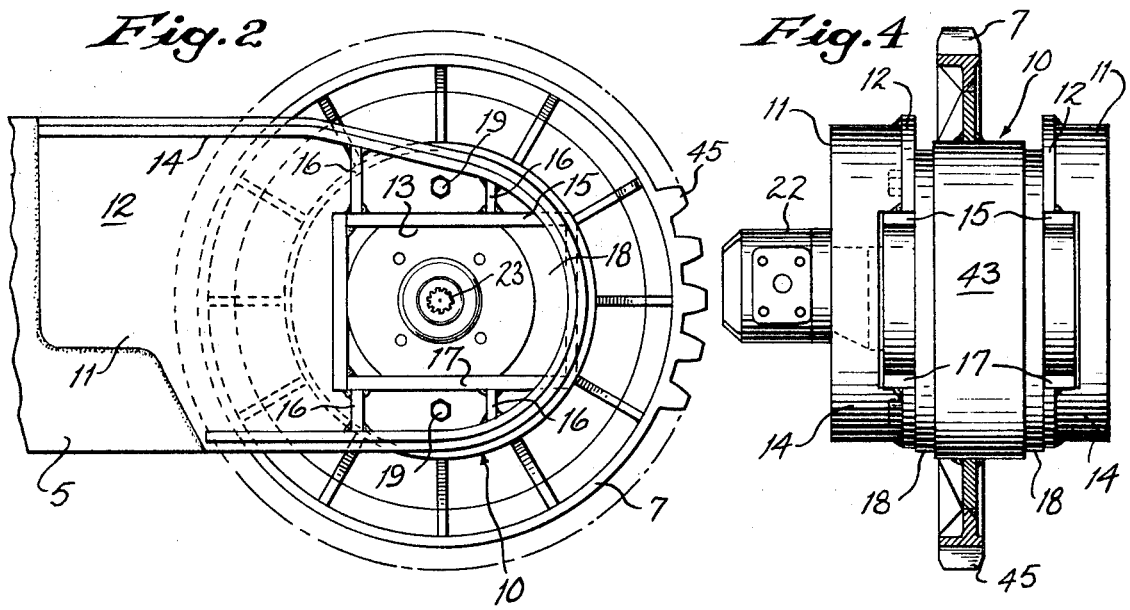
FIG. 2 is an enlarged fragmentary side elevation of the tread frame with the transmission mounted thereon.
Figure 4:
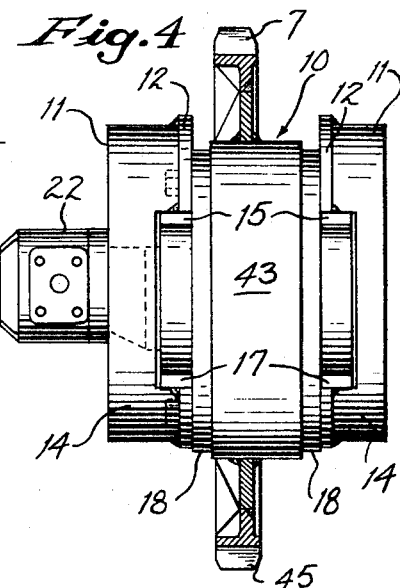
FIG. 4 is an end view of the structure shown in FIG. 2.
Figure 3:
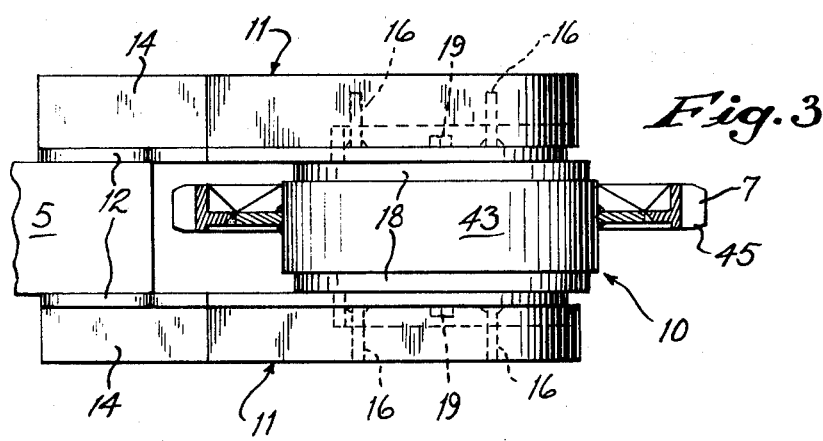
FIG. 3 is a top view of the structure shown in FIG. 2.

According to a feature of the invention, the drive sprocket 7 and transmission 10 are an integral unit and are removably mounted on the frame 5. As best illustrated in FIG. 2 to 4, the mounting structure includes a pair of spaced side members 11 which are welded to the end of the frame 5 and extend outwardly in spaced relation from the frame. Each side member 11 is composed of a generally flat plate 12 having a recess 13 in its outer end and a curved flange 14 extends laterally outward from the peripheral edge of the side plate 12, while a flange 15 of lesser depth than flange 14 borders the recess 13 in each side plate. To provide reinforcement, a series of webs 16 are welded between the flanges 14 and 15.

As shown in FIG. 4, the forward end of each curved flange 14 is notched in order to receive the ends of the flange 15 and the notch defines a slot 17.

The transmission 10 is adapted to be inserted within the space between the side members 11 and transmission 10 includes a pair of fixed end plates 18 that are bolted to the respective side plates 12 by bolts 19. Each of the end plates 18 is provided with an axial opening and one of the openings is enclosed by a cover plate 20 that is bolted to the flange 21 bordering the opening. A hydraulic motor 22 is secured by bolts to the annular flange 21 which extends laterally from the opposite end plate 18. The flanges 21 have a depth such that they will be received within the slots 17 when the transmission 10 is inserted between the side members 11.

To mount the transmission 10 on the tread frame 5, the cover plate 20 and motor 22 are removed and the transmission is then inserted between the side plates 12 with the flanges 21 of the end plates 18 being received within the slots 17. The bolts 19 are inserted and then the cover plate 20 and motor 22 can be installed.

The transmission can be removed in a similar manner by removing the motor 22 and cover plate 20, as well as the bolts 19 and then sliding the transmission 10 from within the space between the side members 11.

Figure 5:
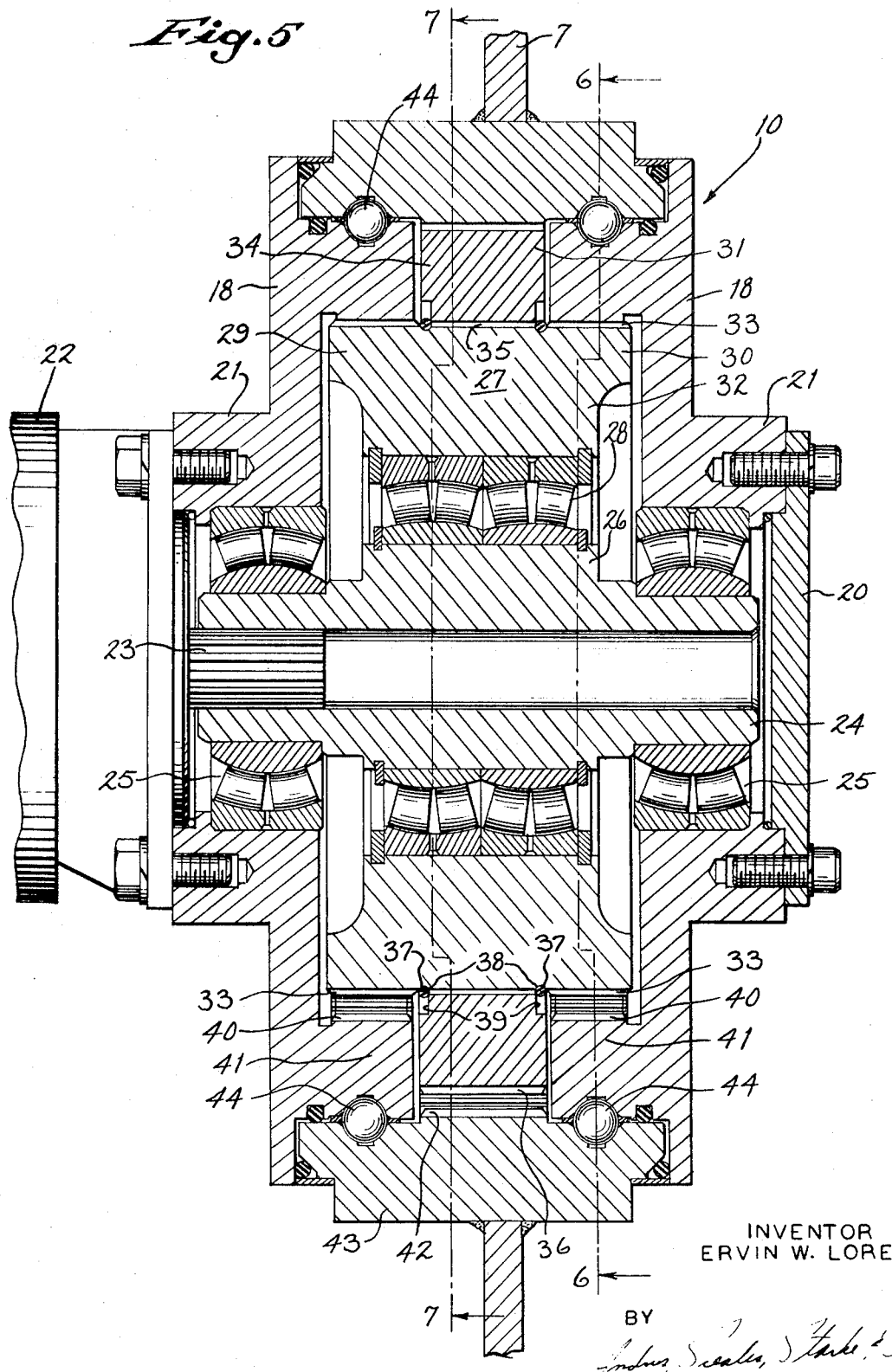
FIG. 5 is a vertical section of the transmission.

As shown in FIG. 5, the drive shaft 23 of the motor 22 is splined or coupled to the end of a horizontal shaft 24, the ends of which are journalled within the flanges 21 of the fixed end plates 18 by bearing assemblies 25.

The central portion of shaft 24 carries an eccentric 26 which is mounted for rotation within an opening in a floating gear unit 27 by bearing assembly 28. Floating gear unit 27 includes a pair of small diameter gears 29 and 30 which are located on either side of a central large diameter gear 31. The small diameter gears 29 and 30 and large diameter gear 31 are formed in a unique manner which insures precise indexing of the teeth of both of the small gears. More specifically, the floating gear unit 27 includes a central annular hub 32, and a series of teeth 33 are machined on the outer periphery of the hub and extend the entire axial length of the hub. The teeth 33 constitute the teeth of the small diameter gears 29 and 30.

The large diameter gear 31 of the floating gear unit 27 comprises a separate outer ring 34 which is provided with a series of internal teeth 35 that are engaged with the teeth 33, and a series of external teeth 36. The teeth 33 on the hub 32 and the internal teeth 35 on the ring 34 are identical in size and shape and provide a locking connection between the hub 32 and the ring. The ring 34 has a smaller axial length than hub 32 and is locked axially in position with respect to the central portion of hub 32, by a pair of retaining rings 37 which are located within grooves 38 formed in the teeth 33. Recesses 39 are provided in the internal edges of the ring to permit the retaining rings 37 to be inserted and withdrawn.

As the teeth 33 extend continuously throughout the axial length of the hub 32 and constitute the teeth for both of the small diameter gears 29 and 30, the teeth of these small diameter gears will be precisely indexed, thereby eliminating the possibility of the teeth on these small diameter gears being angularly displaced or out of phase.

The teeth 33 of the small diameter gear rings 29 and 30 are adapted to engage the teeth 40 of gear rings 41 that are formed integrally with the respective end plates 18. While the specific shape of the teeth 33 and 40 is not critical, the teeth 33 and 40 are of identical shape and size. However, each gear ring 41 has a greater number of teeth 40 than the corresponding small diameter gear and this results in the external diameter of the gears 29 and 30 being substantially smaller than the internal diameter of the gear rings 41. Due to the difference in the number of teeth, only about 10 or 12 teeth 33 of the gear rings 29 and 30 will be in engagement with the teeth 40 of the corresponding gear ring 41 at any time during rotation of the floating gear unit 27.

The teeth 36 of the large diameter gear 31 are adapted to engage the teeth 42 of a sprocket hub 43 that is journalled on the outer periphery of the end plates 18 by ball bearing assemblies 44. The sprocket 7 has a series of teeth 45 which are adapted to engage lugs, not shown, on the undersurface of the endless tread 6.

The teeth 36 and 42 are also identical in size and shape to each other and are also identical in size and shape to the teeth 33 and 40. There are a lesser number of teeth 36 than teeth 42 and the difference between the number of teeth is the same as the difference in the number of teeth between teeth 33 and 40. For example, if there are 106 teeth 33, and 110 teeth 40, a difference of four, there can be 136 teeth 36 and 140 teeth 42, also a difference of four.

As the eccentric 26 is rotated by the motor shaft 24 the floating gear unit 27 will be moved at a reduced speed and in the opposite direction of rotation of the eccentric by a wedging type of action. For example, if the small diameter gears 29 and 30 each contain 106 teeth, while the corresponding gear rings 41 contain 110 teeth, a difference of four, the small diameter gears 29 and 30 will move through an arc equal to the length of four teeth during each revolution of the eccentric 26. Thus, a speed reduction is provided between the input shaft and the small diameter gears with the gear unit 27 moving through an arc equal in length to the difference in the number of teeth between the gears 29 and 30 and the gear rings 41 during each revolution of the eccentric.

As the small diameter gears 29 and 30 are integral with the large diameter gear 31, the large diameter gear will move through the same angular displacement as the small gears 29 and 30. However, as the teeth 36 on the large gear 31 are the same size as the teeth 33 on the small diameter gears, the angular displacement does not equal the arc inscribed by the four teeth on the large diameter gear 31. Thus, as the large diameter gear 31 moves with the small diameter gears, the output member or sprocket 7, will slip or move by a wedging action in the opposite direction of rotation of gear unit 27 a distance sufficient to enable the teeth on the large diameter gear 31 to maintain engagement with the teeth 42 of the sprocket 7 and this results in the sprocket moving in the opposite direction and at a slower rate of speed than the floating gear unit 27 to provide a second stage speed reduction.

The transmission of the invention provides a substantially greater speed reduction from the hydraulic motor to the drive sprocket than is normally achieved by a conventional gear train transmission. This speed reduction is generally in the range of about 130 : 1 and this reduction enables the motor to operate at optimum efficiency and provide an output to the drive sprocket of approximately 10 r.p.m. which is the most desirable output speed.

The use of the two small diameter gears 29 and 30 in conjunction with the single large diameter gear 31 eliminates problems of side thrust that are normally encountered when dealing with substantial loads as encountered in heavy construction equipment.

Moreover, the manner in which the gears on the floating gear unit are formed is unique and insures positive indexing of the small diameter gears 29 and 30 at all times, as well as reducing the overall size of the floating gear unit.

The transmission of the invention can be readily installed and withdrawn from the tread frame with a minimum of labor and this feature provides a substantial aid in maintenance and repair for the unit.

Various modes of carrying out the invention are contemplated as being within the scope of the following claims particularly pointing out and distinctly claiming the subject matter which is regarded as the invention.

I claim:

1. In combination with a supporting structure having a pair of side members that define a slot, a transmission unit disposed within the slot and secured to said side members, said transmission unit comprising a housing including a pair of spaced end plates, with each end plate secured to a side member of the supporting structure and having an inwardly extending annular flange, said flanges being spaced axially apart, drive means mounted on one of said end plates and having a drive shaft extending through an opening in said end plate to the interior of said housing, eccentric means located within the housing and operably connected to the drive shaft, a floating gear unit having a central opening to rotatably receive the eccentric means, said floating geat unit including a pair of axially spaced first gears with each of said first gears disposed radially inward of one of said flanges and having a series of teeth, said second gear having a larger diameter than said first gears and said first gears having the same diameter, said gear unit is formed of a central annular hub and a separate outer ring member secured to the outer surface of said hub, said ring member having a substantially smaller axial length than said hub and being secured generally centrally of the axial length of the hub, the end portions of the outer periphery of the hub on either side of the ring member being exposed and constituting said first gears, the outer peripheral surface of said hub being provided with a series of external teeth which extend substantially continuously the length of the hub, and the portions of said external teeth at the end portions of the hub constituting the teeth of said first gears, the outer surface of said ring member defining said second gear, the inner peripheral surface of the ring member having a series of internal teeth engaged with the external teeth on the hub to prevent relative rotational movement between the ring member and the hub, a first gear ring disposed on each of said annular flanges with each first gear ring having a series of internal teeth disposed in engagement with the teeth of a first gear, said first gear rings having a greater number of teeth than the corresponding first gears, a rotatable annular output member having a series of internal teeth disposed in engagement with the teeth of the second gear, said output member having a greater number of teeth than the second gear and the difference in the number of teeth between the first gears and the respective first gear rings being the same as the difference in the number of teeth between the second gear and the output member, and bearing means for journalling said output member on the outer peripheral surface of each of said annular flanges.

2. A drive mechanism, comprising a housing, eccentric means located within the housing, drive means located on the exterior of the housing and including a drive shaft connected to said eccentric means, a floating gear unit having a central opening to rotatably receive the eccentric means, said floating gear unit including a pair of axially spaced first gears with each of said first gears having a series of teeth and including a second gear located between the first gears and having a series of teeth, said second gear having a different diameter than said first gears, a pair of fixed first gear rings connected to the housing with each first gear ring having a series of internal teeth disposed in engagement with the teeth of a first gear, said first gear rings having a greater number of teeth than the corresponding first gears, a rotatable annular output member having a series of internal teeth disposed in engagement with the teeth of the second gear, said output member having a greater number of teeth than the second gear and the difference in the number of teeth between the first gears and the respective first gear rings being the same as the difference in the number of teeth between the second gear and the output member, journalling means for journalling said output member with respect to said housing, said gear unit including a central annular hub and a separate outer ring member secured to the outer surface of said hub, said ring member having a substantially smaller axial length than said hub and being secured generally centrally of the axial length of the hub, the end portions of the outer periphery of the hub on either side of the ring member being exposed and constituting said first gears, the outer peripheral surface of said hub being provided with a series of external teeth which extend substantially continuously the length of the hub, and the portions of said external teeth at the end portions of the hub constituting the teeth of said first gears, the outer surface of said ring member defining said second gear.

3. The drive mechanism of claim 2, wherein the inner peripheral surface of the ring member is provided with a series of internal teeth engaged with the external teeth on the hub to prevent relative rotational movement between the ring member and the hub.

4. The drive mechanism of claim 3, and including means to prevent relative axial movement between said hub and said ring member.

5. The drive mechanism of claim 3, wherein the number of said internal teeth is the same as the number of said external teeth.

* * * * *